United States Patent
Anno et al.

(10) Patent No.: US 9,315,070 B2
(45) Date of Patent: Apr. 19, 2016

(54) VEHICLE BEARING DEVICE

(71) Applicant: JTEKT CORPORATION, Osaka-shi, Osaka (JP)

(72) Inventors: Hiroshi Anno, Sakai (JP); Katsuyuki Harada, Yamatokoriyama (JP); Alexander Schupp, Munich (DE); Josef Altweck, Kirchroth (DE)

(73) Assignee: JTEKT CORPORATION, Osaka-shi (JP)

( * ) Notice: Subject to any disclaimer, the term of this patent is extended or adjusted under 35 U.S.C. 154(b) by 260 days.

(21) Appl. No.: 14/081,425

(22) Filed: Nov. 15, 2013

(65) Prior Publication Data

US 2014/0175862 A1 Jun. 26, 2014

(30) Foreign Application Priority Data

Dec. 20, 2012 (JP) .................................. 2012-278200

(51) Int. Cl.
| | |
|---|---|
| *F16F 15/32* | (2006.01) |
| *F16F 15/22* | (2006.01) |
| *F16F 15/14* | (2006.01) |

(Continued)

(52) U.S. Cl.
CPC ......... *B60B 27/0047* (2013.01); *B60B 27/0052* (2013.01); *F16D 25/12* (2013.01); *B60B 2900/111* (2013.01); *Y02T 10/86* (2013.01)

(58) Field of Classification Search
CPC ................. F16D 65/12; F16D 65/123; F16D 2065/1316; F16D 2065/1384; B60T 1/065; B60B 27/00; B60B 27/0057; B60B 27/0063; B60B 27/0005; B60B 27/001; F16F 15/32; F16F 15/22; F16F 15/14; F16F 15/324

USPC .......... 301/6.8, 105.1; 384/544; 188/218 XL, 188/18 A

See application file for complete search history.

(56) References Cited

U.S. PATENT DOCUMENTS

| | | | | |
|---|---|---|---|---|
| 5,921,633 | A | * | 7/1999 | Neibling et al. ............... 301/6.1 |
| 6,978,866 | B2 | * | 12/2005 | Niebling et al. ............ 188/18 A |
| 7,547,077 | B2 | * | 6/2009 | Melberg et al. ............ 301/108.1 |

(Continued)

FOREIGN PATENT DOCUMENTS

DE 103 23 310 A1 12/2004

OTHER PUBLICATIONS

Apr. 8, 2014 Search Report issued in European Patent Application No. 13197696.1.

*Primary Examiner* — Brodie Follman
*Assistant Examiner* — James Triggs
(74) *Attorney, Agent, or Firm* — Oliff PLC

(57) ABSTRACT

A hub of a vehicle bearing device has a cylindrical portion and a flange portion. The flange portion has a pin hole formation portion, a reference position intermediate portion, separate position intermediate portions, and build-up portions. The reference position intermediate portion is formed between bolt hole formation portions. The first separate position intermediate portion is formed between bolt hole formation portions. The second separate position intermediate portion is formed between bolt hole formation portions. The pin hole formation portion is formed at the reference position intermediate portion, and has a hub side pin hole. A pin for fixing the hub and a brake rotor to each other is inserted into the hub side pin hole. The build-up portions are formed on the separate position intermediate portions, and are balanced in terms of weight with the pin-hole formation portion.

8 Claims, 7 Drawing Sheets

(51) Int. Cl.
  *B60B 27/00* (2006.01)
  *F16D 25/12* (2006.01)

(56) References Cited

U.S. PATENT DOCUMENTS 7,600,614 B2 * 10/2009 Doppling et al. ....... 188/218 XL
7,631,948 B2 * 12/2009 Hofmann et al. .......... 301/105.1
7,871,134 B2 * 1/2011 Hofmann et al. .......... 301/105.1
7,934,777 B1 * 5/2011 Yuhas ........................... 301/6.8
8,287,052 B2 * 10/2012 Fakhoury et al. ......... 301/105.1
2004/0134720 A1 * 7/2004 Niebling et al. ............. 188/18 A
2011/0127826 A1 6/2011 Krabill et al.
2011/0194797 A1 8/2011 Yamamoto et al.

* cited by examiner

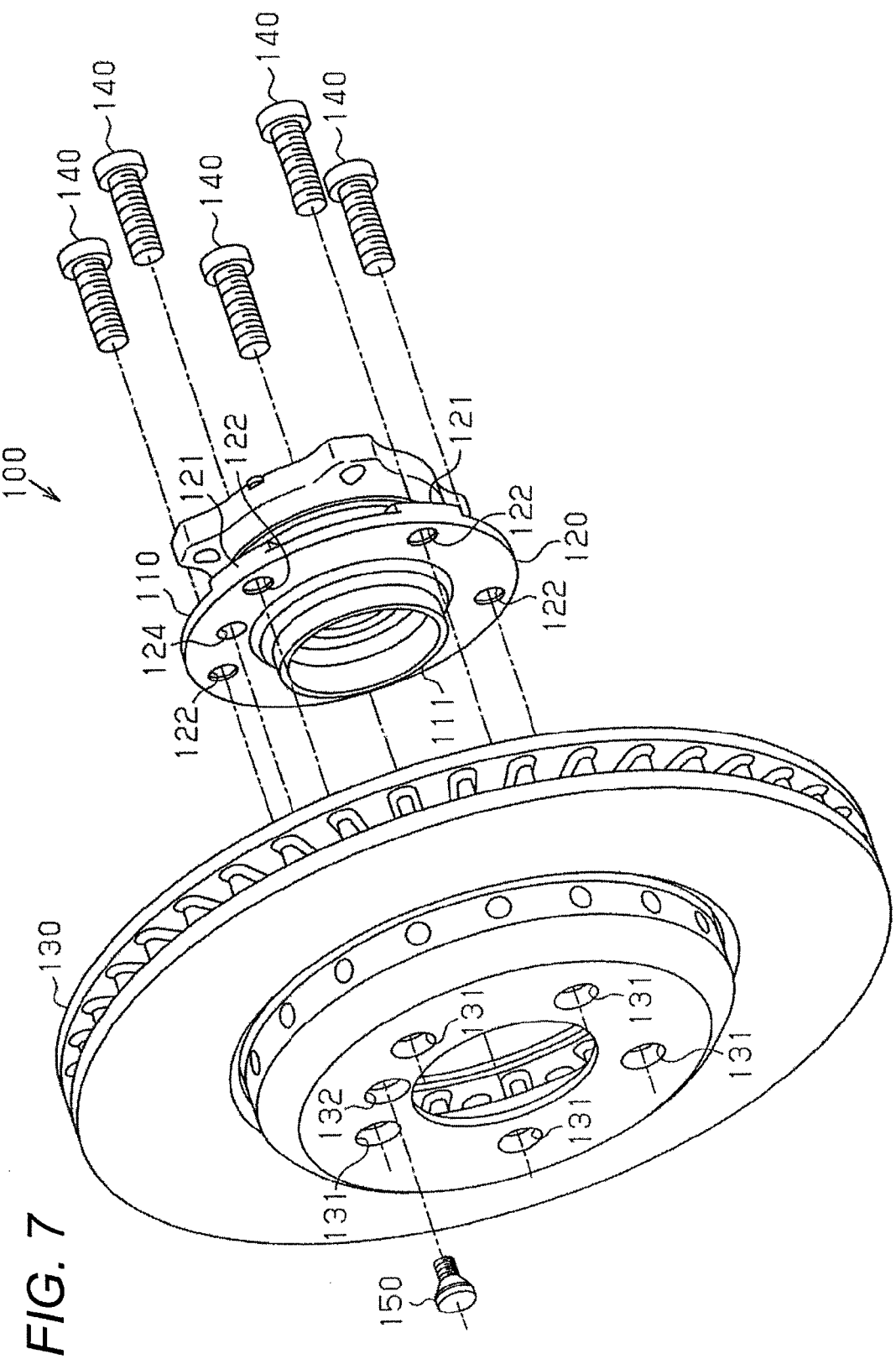

VEHICLE BEARING DEVICE

BACKGROUND

1. Technical Field

The present invention relates to a vehicle bearing device.

2. Description of Related Art

FIGS. 6 and 7 show a conventional vehicle bearing device 100.

As shown in FIG. 7, the vehicle bearing device 100 has a hub 110. As shown in FIG. 6, the hub 110 has a cylindrical portion 111, and a flange portion 120. The flange portion 120 has five bolt hole formation portions 121, a pin hole formation portion 123, and four ribs 125. The bolt hole formation portions 121 have hub side bolt holes 122. The five bolt hole formation portions 121 are formed at equal intervals in the peripheral direction of the flange portion 120.

The pin hole formation portion 123 is formed between one of the bolt hole formation portions 121 adjacent to each other and another bolt hole formation portion 121. The pin hole formation portion 123 has a hub side pin hole 124. Each rib 125 is formed between one of the bolt hole formation portions 121 adjacent to each other and another bolt hole formation portion 121. The pin hole formation portion 123 and the four ribs 125 are formed at equal intervals in the peripheral direction of the flange portion 120. Each rib 125 differs from the pin hole formation portion 123 in that it has no hub side pin hole 124; otherwise, it is of the same construction as the pin hole formation portion 123. Patent Document 1 discloses a vehicle bearing device having a structure similar to that of the conventional vehicle bearing device 100.

FIG. 7 shows the relationship between the vehicle bearing device 100 and a brake rotor 130.

The brake rotor 130 is fixed to the hub 110 by five wheel bolts 140 and a pin 150. The brake rotor 130 has five rotor side bolt holes 131 and a rotor side pin hole 132.

The brake rotor 130 is fixed to the hub 110 by the following procedures.

First, the hub 110 of the vehicle bearing device 100 is superimposed on the brake rotor 130. The hub side pin hole 124 is opposite to the rotor side pin hole 132. The hub side bolt holes 122 are opposite to the rotor side bolt holes 131.

Next, a pin 150 is inserted into the rotor side pin hole 132 and the hub side pin hole 124. The pin 150 is inserted into the rotor side pin hole 132 from the brake rotor 130 side. Next, one wheel bolt 140 is inserted into a hub side bolt hole 122, a rotor side bolt hole 131 and a bolt hole (not shown) foamed on a wheel. This one wheel bolt 140 is screwed into the rotor side bolt hole 131 from the side opposite to the brake rotor 130 side. By the same procedure, the remaining four wheel bolts 140 are inserted into the hub side bolt holes 122, the rotor side bolt holes 131 and the bolt holes (not shown) formed on the wheel.

Patent Document 1: US Patent Application Publication No. 2011/0127826

SUMMARY

The conventional vehicle bearing device 100 has four ribs 125 for balancing in terms of weight around the hub 110. However, due to the existence of the four ribs 125, the weight of the vehicle bearing device 100 is rather large.

The present invention has been made in view of the above problem; it is an object of the present invention to provide a vehicle bearing device whose hub is well-balanced in weight and which helps to achieve a reduction in weight.

The vehicle bearing device includes: a hub. The hub is a portion to which a brake rotor is fixed and which has a cylindrical portion and a flange portion. The flange portion has a plurality of bolt hole formation portions protruding outwardly from the cylindrical portion, one pin hole formation portion, one reference position intermediate portion, two adjacent position intermediate portions, one or a plurality of separate position intermediate portions, and a balance adjustment portion. The reference position intermediate portion is formed between the bolt hole formation portions adjacent to each other in the peripheral direction of the cylindrical portion. The adjacent position intermediate portions are formed between the bolt hole formation portions adjacent to each other in the peripheral direction of the cylindrical portion, and are formed at positions adjacent to the reference position intermediate portion with the bolt hole formation portion therebetween in the peripheral direction of the cylindrical portion. The separate position intermediate portions are formed between the bolt hole formation portions adjacent to each other in the peripheral direction of the cylindrical portion. The separate position intermediate portions are formed at positions adjacent to the adjacent position intermediate portions with the bolt hole formation portions therebetween in the peripheral direction of the cylindrical portion and at positions on the side opposite to the reference position intermediate portion with respect to the adjacent position intermediate portions. The bolt hole formation portions have hub side bolt holes. The plurality of bolt hole formation portions are formed at equal intervals in the peripheral direction of the flange portion. The hub side bolt holes are formed as portions into which wheel bolts for fixing the hub and the brake rotor to each other are inserted. The pin hole formation portion is formed at the reference position intermediate portion, and has a hub side pin hole. The hub side pin hole is formed as a portion into which a pin for fixing the hub and the brake rotor to each other is inserted. The balance adjustment portion is formed at the one or the plurality of separate position intermediate portions, and is well-balanced in weight with the pin hole formation portion.

The present vehicle bearing device helps to keep a hub in balance in terms of weight and to achieve a reduction in weight.

BRIEF DESCRIPTION OF THE DRAWINGS

FIG. 7 is a perspective view illustrating the step of fixing to each other the hub and the brake rotor of the conventional vehicle bearing device.

DETAILED DESCRIPTION (First Embodiment)

The construction of a vehicle bearing device 10 will be described with reference to FIGS. 1 and 2.

Figure 1:
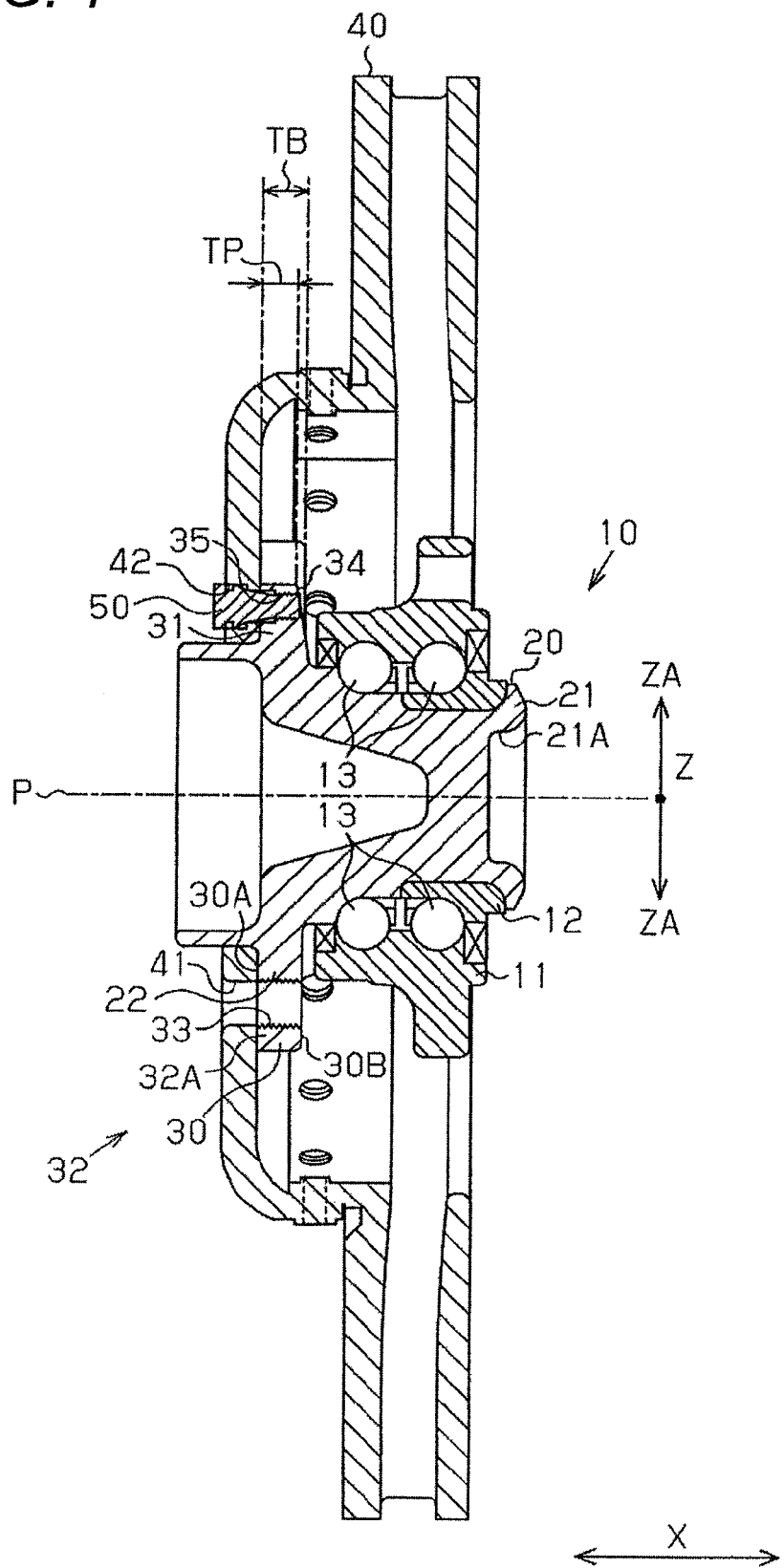
FIG. 1 is a sectional view illustrating the overall structure of a vehicle bearing device according to a first embodiment.

As shown in FIG. 1, the vehicle bearing device 10 is formed as a bearing device for a driven wheel. The vehicle bearing device 10 has an outer ring 11, an inner ring 12, rolling elements 13, and a hub 20. The vehicle bearing device 10 is fixed to a brake rotor 40 by a wheel bolt (not shown) and a pin 50.

The inner ring 12 is fixed to the outer peripheral portion of the hub 20. The rolling elements 13 are arranged between the outer ring 11 and the inner ring 12 and between the outer ring 11 and the hub 20. The outer ring 11 is arranged around the inner ring 12. The inner ring 12 and the hub 20 rotate relative to the outer ring 11.

The hub 20 has a cylindrical portion 21 and a flange portion 30. The cylindrical portion 21 has an axle arrangement hole 21A. The axle arrangement hole 21A is formed at an end portion in the axial direction of the cylindrical portion 21 (hereinafter referred to as the "axial direction X." The hub 20 has the axial direction X, a peripheral direction R, and a radial direction Z. The axial direction X is a direction parallel to the center axis P of the hub 20. The peripheral direction R is the rotational direction around the center axis P of the hub 20. The peripheral direction R includes a first peripheral direction RA and a second peripheral direction RB. The first peripheral direction RA is a clockwise direction with respect to the center axis P as seen in FIG. 2. The second peripheral direction RB is a counterclockwise direction with respect to the center axis P as seen in FIG. 2. The radial direction Z is a radial direction around the center axis P. In the following description, a plane orthogonal to the center axis P will be referred to as the reference plane.

Figure 2:
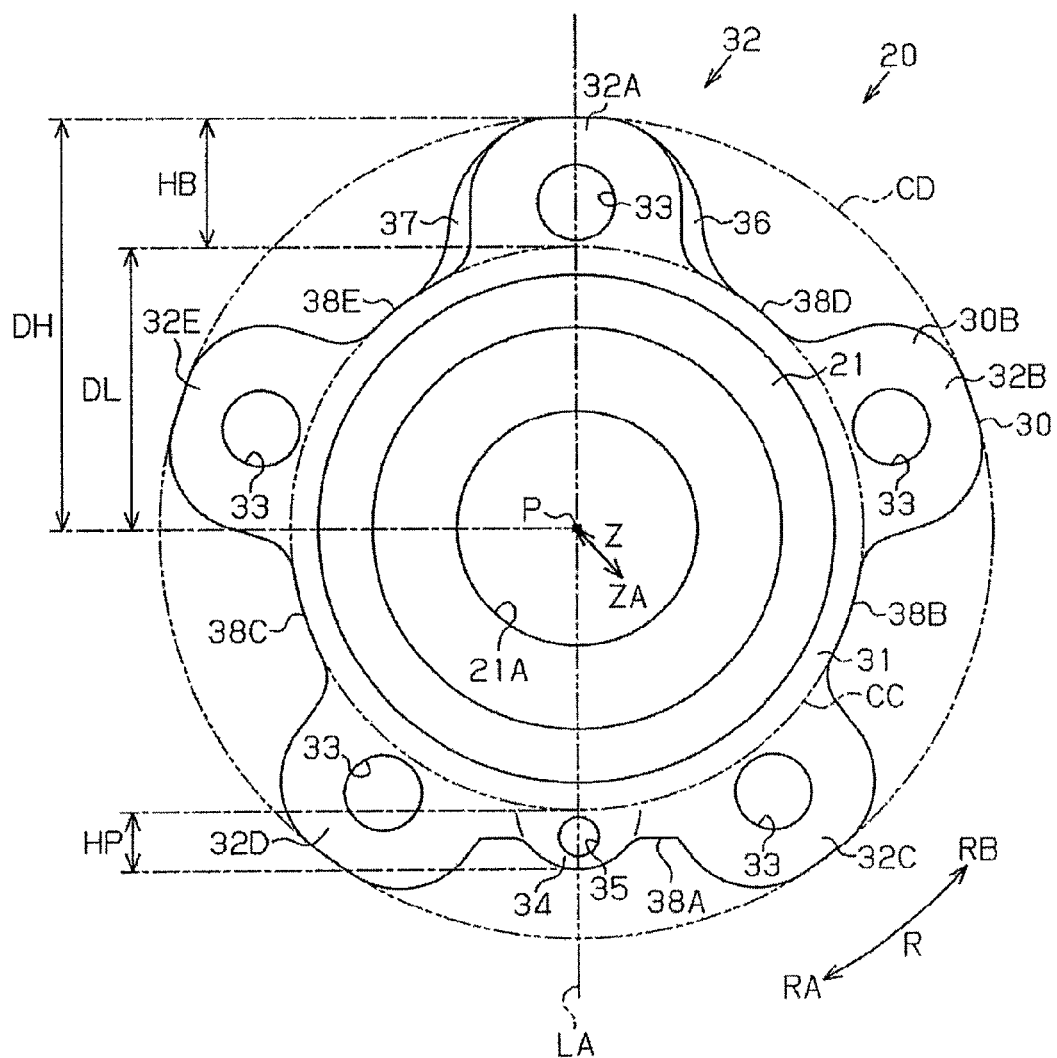
FIG. 2 is a front view illustrating the front structure of a hub according to the first embodiment.

As shown in FIG. 2, the flange portion 30 has an inner peripheral portion 31, a bolt hole formation portion group 32, a pin hole formation portion 34, and a first build-up portion 36 and a second build-up portion 37 as balance adjustment portions. The flange portion 30 has a reference position intermediate portion 38A, a first adjacent position intermediate portion 38B, a second adjacent position intermediate portion 38C, a first separate position intermediate portion 38D, and a second separate position intermediate portion 38E. The flange portion 30 has a wheel facing surface 30A (refer to FIG. 1) and a vehicle body facing surface 30B. The flange portion 30 is coaxial with the center axis P of the hub 20. The maximum radius of the flange portion 30 (hereinafter referred to as the "flange maximum radius DH") is determined by a phantom circle CD formed around the center axis P. The minimum radius of the flange portion 30 (hereinafter referred to as the "flange minimum radius DL") is determined by the outer peripheral surface of an inner peripheral portion 31.

As shown in FIG. 1, the wheel facing surface 30A faces the brake rotor 40 in the axial direction X. The wheel facing surface 30A has a flat configuration. The vehicle body facing surface 30B faces the vehicle body (not shown) in the axial direction X. The vehicle body facing surface 30B has a curved configuration.

As shown in FIG. 2, the inner peripheral portion 31 has an annular configuration. The inner peripheral portion 31 is formed integrally with the cylindrical portion 21. The inner peripheral portion 31 protrudes outwards in the radial direction Z (hereinafter referred to as "outward ZA") from the outer peripheral portion of the cylindrical portion 21. The portions of the inner peripheral portion 31 corresponding to the intermediate portions 38A through 38E have a flange minimum diameter DL.

In the first peripheral direction RA, the bolt hole formation portion group 32 has bolt hole formation portions 32A through 32E in the order of: the first bolt hole formation portion 32A, the second bolt hole formation portion 32B, the third bolt hole formation portion 32C, the fourth bolt hole formation portion 32D, and the fifth bolt hole formation portion 32E. The bolt hole formation portions 32A through 32E have a flange maximum diameter DH. The distal end portions of the bolt hole formation portions 32A through 32E are situated on the phantom circle CD.

Each of the bolt hole formation portions 32A through 32E has a hub side bolt hole 33. The bolt hole formation portions 32A through 32E protrude outwards ZA from the inner peripheral portion 31. The bolt hole formation portions 32A through 32E are formed at equal intervals in the peripheral direction R. The bolt hole formation portions 32A through 32E are adjacent to each other in the peripheral direction R at a predetermined interval. The bolt hole formation portions 32A through 32E are of the same configuration. The distal end portions in the radial direction of the bolt hole formation portions 32A through 32E are of an arcuate configuration, with their central portions in the peripheral direction R protruding furthermost outwards ZA. The sizes of the respective bolt hole formation portions 32A to 32E in the peripheral direction R are the same with one another.

The first bolt hole formation portion 32A and the second bolt hole formation portion 32B are adjacent to each other in the peripheral direction R with the first separate position intermediate portion 38D therebetween. The second bolt hole formation portion 32B and the third bolt hole formation portion 32C are adjacent to each other in the peripheral direction R with the first adjacent position intermediate portion 38B therebetween. The third bolt hole formation portion 32C and the fourth bolt hole formation portion 32D are adjacent to each other in the peripheral direction R with the reference position intermediate portion 38A therebetween. The fourth bolt hole formation portion 32D and the fifth bolt hole formation portion 32E are adjacent to each other in the peripheral direction R with the second adjacent position intermediate portion 38C therebetween. The fifth bolt hole formation portion 32E and the first bolt hole formation portion 32A are adjacent to each other in the peripheral direction R with the second separate position intermediate portion 38E therebetween.

The hub side bolt holes 33 extend through the bolt hole formation portions 32A through 32E in the axial direction X. Each hub side bolt hole 33 has a female screw. The five hub side bolt holes 33 are formed at equal intervals in the peripheral direction R.

The reference position intermediate portion 38A, the first adjacent position intermediate portion 38B, the second adjacent position intermediate portion 38C, the first separate position intermediate portion 38D, and the second separate position intermediate portion 38E correspond to the spaces formed through partial lightening of the flange of an annular configuration.

The reference position intermediate portion 38A corresponds to a space surrounded, in the reference plane, by the inner peripheral portion 31, the phantom circle CD, a side portion of the third bolt hole formation portion 32C, and a side portion of the fourth bolt hole formation portion 32D. In the reference plane, the reference position intermediate portion 38A is opposite to the first bolt hole formation portion 32A via the center axis P of the hub 20.

The first adjacent position intermediate portion 38B corresponds to a space surrounded, in the reference plane, by the inner peripheral portion 31, the phantom circle CD, a side portion of the third bolt hole formation portion 32C, and a side portion of the second bolt hole formation portion 32B. The first adjacent position intermediate portion 38B is adjacent to the reference position intermediate portion 38A in the peripheral direction R with the third bolt hole formation portion 32C therebetween.

The second adjacent position intermediate portion 38C corresponds to a space surrounded, in the reference plane, by the inner peripheral portion 31, the phantom circle CD, a side portion of the fourth bolt hole formation portion 32D, and a side portion of the fifth bolt hole formation portion 32E. The second adjacent position intermediate portion 38C is adjacent to the reference position intermediate portion 38A in the peripheral direction R with the fourth bolt hole formation portion 32D therebetween.

The first separate position intermediate portion 38D corresponds to a space surrounded, in the reference plane, by the inner peripheral portion 31, the phantom circle CD, a side portion of the second bolt hole formation portion 32B, and a side portion of the first bolt hole formation portion 32A. The first separate position intermediate portion 38D is adjacent to the first adjacent position intermediate portion 38B in the peripheral direction R with the second bolt hole formation portion 32B therebetween.

The second separate position intermediate portion 38E corresponds to a space surrounded, in the reference plane, by the inner peripheral portion 31, the phantom circle CD, a side portion of the fifth bolt hole formation portion 32E, and a side portion of the first bolt hole formation portion 32A. The second separate position intermediate portion 38E is adjacent to the second adjacent position intermediate portion 38C in the peripheral direction R with the fifth bolt hole formation portion 32E therebetween.

The pin hole formation portion 34 is formed integrally with the inner peripheral portion 31. The pin hole formation portion 34 protrudes outwards ZA from the inner peripheral portion 31. The pin hole formation portion 34 is formed in the reference position intermediate portion 38A. In the reference plane, the pin hole formation portion 34 is opposite to the first bolt hole formation portion 32A with the center axis P of the flange portion 30 therebetween. The pin hole formation portion 34 has a hub side pin hole 35. The distal end portion on the outward ZA side of the pin hole formation portion 34 has an arcuate configuration whose central portion in the peripheral direction R protrudes furthermost outwards ZA in the radial direction Z.

The length of the pin hole formation portion 34 (hereinafter referred to as the "insertion portion length HP") is smaller than the length of the bolt hole formation portions 32A through 32E (hereinafter referred to as the "formation portion length HB"). In the reference plane, the insertion portion length HP indicates the distance from a phantom circle CC passing the outer peripheral surface of the inner peripheral portion 31 to the distal end portion of the pin hole formation portion 34. The formation portion length HB indicates, in the reference plane, the distance from the phantom circle CC passing the outer peripheral surface of the inner peripheral portion 31 to the distal end portion on the outward ZA side of each of the bolt hole formation portions 32A through 32E.

As shown in FIG. 1, the thickness of the pin hole formation portion 34 (hereinafter referred to as the "insertion portion thickness TP") is smaller than the thickness of the bolt hole formation portions 32A through 32E (hereinafter referred to as the "formation portion thickness TB"). In the axial direction X, the insertion portion thickness TP indicates the distance from the wheel facing surface 30A of the pin hole formation portion 34 to the vehicle body facing surface 30B. In the axial direction X, the formation portion thickness TB indicates the distance from the wheel facing surface 30A to the vehicle body facing surface 30B of each of the bolt hole formation portions 32A through 32E.

The hub side pin hole 35 extends through the pin hole formation portion 34 in the axial direction X. The hub side pin hole 35 is formed as a portion into which the pin 50 is inserted. The hub side pin hole 35 has a female screw. The center axis of the hub side pin hole 35 is situated on a phantom line LA passing the hub side bolt hole 33 of the first bolt hole formation portion 32A and the center axis P of the flange portion 30.

As shown in FIG. 2, the first build-up portion 36 is formed integrally with the first bolt hole formation portion 32A. The first build-up portion 36 is formed on the side portion on the first peripheral direction RA side of the first bolt hole formation portion 32A. The first build-up portion 36 is formed in the first separate position intermediate portion 38D. The thickness of the first build-up portion 36 is smaller than the formation portion thickness TB. The thickness of the first build-up portion 36 indicates the dimension from the wheel facing surface 30A (refer to FIG. 1) to the vehicle body facing surface 30B of the first build-up portion 36.

The second build-up portion 37 is formed integrally with the first bolt hole formation portion 32A. The second build-up portion 37 is formed on the side portion on the second peripheral direction RB side of the first bolt hole formation portion 32A. The second build-up portion 37 is formed in the second separate position intermediate portion 38E. The thickness of the second build-up portion 37 is smaller than the formation portion thickness TB. The thickness of the second build-up portion 37 indicates the dimension from the wheel facing surface 30A (refer to FIG. 1) to the vehicle body facing surface 30B of the second build-up portion 37.

The first build-up portion 36 has a volume VA and a weight WA. The second build-up portion 37 has a volume VB and a weight WB. The pin hole formation portion 34 has a volume VC and a weight WC. The sum of the volume VA and the volume VB is equal to the volume VC. The sum of the weight WA and the weight WB is equal to the weight WC. Thus, the first build-up portion 36 and the second build-up portion 37 are balanced with the pin hole formation portion 34 in terms of weight.

A method for fixing the brake rotor 40 to the hub 20 will be described with reference to FIG. 1. The brake rotor 40 has five rotor side bolt holes 41 and one rotor side pin hole 42.

The brake rotor 40 is fixed to the hub 20 by the following procedure.

First, the hub 20 of the vehicle bearing device 10 is superimposed on the brake rotor 40. The hub side pin hole 35 is opposite to the rotor side pin hole 42. The hub side bolt holes 33 are opposite to the rotor side bolt holes 41.

Next, the pin 50 is inserted into the rotor side pin hole 42 and the hub side pin hole 35. The pin 50 is inserted into the rotor side pin hole 42 from the brake rotor 40 side.

Next, one wheel bolt (not shown) is inserted into the hub side pin hole 35, the rotor side bolt hole 41 and a bolt hole (not shown) formed on the wheel. This one wheel bolt (not shown) is screwed into the rotor side bolt hole 41 from the side opposite to the brake rotor 130 side. By the same procedure, the remaining four wheel bolts (not shown) are inserted into the hub side pin holes 35, the rotor side bolt holes 41 and bolt holes (not shown) formed on the wheel.

The operation of the vehicle bearing device 10 will be described in comparison with the hub of the comparative example.

The hub of the comparative example (hereinafter referred to as the "comparative hub") differs from the hub 20 in that the first build-up portion 36 and the second build-up portion 37 do not exist thereon; otherwise, it is of the same construction as the hub 20. For the sake of convenience, in the following description, the components of the comparative hub common to those of the hub 20 are indicated by the same reference numerals as those of the hub 20.

The comparative hub has one pin hole formation portion 34. Thus, due to the existence of the pin hole formation portion 34, even if the bolt hole formation portions 32A through 32E are formed in the same configuration, the comparative hub as a whole cannot attain balance in terms of weight. Thus, balancing in weight of the comparative hub as a whole is desired. One way of attaining balance in weight is to form a rib of a configuration similar to or the same as that of the pin hole formation portion 34 in the intermediate portions 38B through 38E other than the reference position intermediate portion 38A. In the case of this method, such a rib is formed on each of the intermediate portions 38B through 38E, resulting in an increase in the weight of the comparative hub. Thus, while it makes it possible to attain balance in terms of weight, this method is undesirable from the viewpoint of a reduction in weight.

In addition to the single pin hole formation portion 34, the hub 20 has the first build-up portion 36 and the second build-up portion 37. The first build-up portion 36 and the second build-up portion 37 cooperate to help attain balance in weight with the pin hole formation portion 34. On the other hand, the hub 20 has no balance adjustment portion for attaining balance in weight with the single pin hole formation portion 34 on the first adjacent position intermediate portion 38B and the second adjacent position intermediate portion 38C. As a result, the hub 20 is reduced in weight as compared with the comparative hub. That is, the hub 20 has a structure balanced in weight and contributing to a reduction in weight.

The vehicle bearing device 10 according to the first embodiment has the following advantages:

(1) The flange portion 30 has the build-up portions 36 and 37 as balance adjustment portions on the separate position intermediate portions 38D and 38E. Thus, the hub 20 can be balanced in terms of weight; further, the hub 20 can be reduced in weight as compared with the comparative hub.

(2) The radius of the hub 20 at the reference position intermediate portion 38A, the adjacent position intermediate portions 38B and 38C, and the separate position intermediate portions 38D and 38E, is smaller than the radius of the hub 20 at the bolt hole formation portions 32A through 32E. That is, in the flange portion 30, lightening is effected at the reference position intermediate portion 38A, the adjacent position intermediate portions 38B and 38C, and the separate position intermediate portions 38D and 38E. Thus, it is possible to achieve a further reduction in the weight of the hub 20.

(Second Embodiment)

The construction of the vehicle bearing device 10 according to the second embodiment differs from that of the vehicle bearing device 10 according to the first embodiment in the following portions; otherwise, the second embodiment is of the same construction as the first embodiment. The vehicle bearing device 10 according to the first embodiment has five bolt holes 33. The vehicle bearing device 10 according to the second embodiment has four bolt holes 63.

Figure 3:
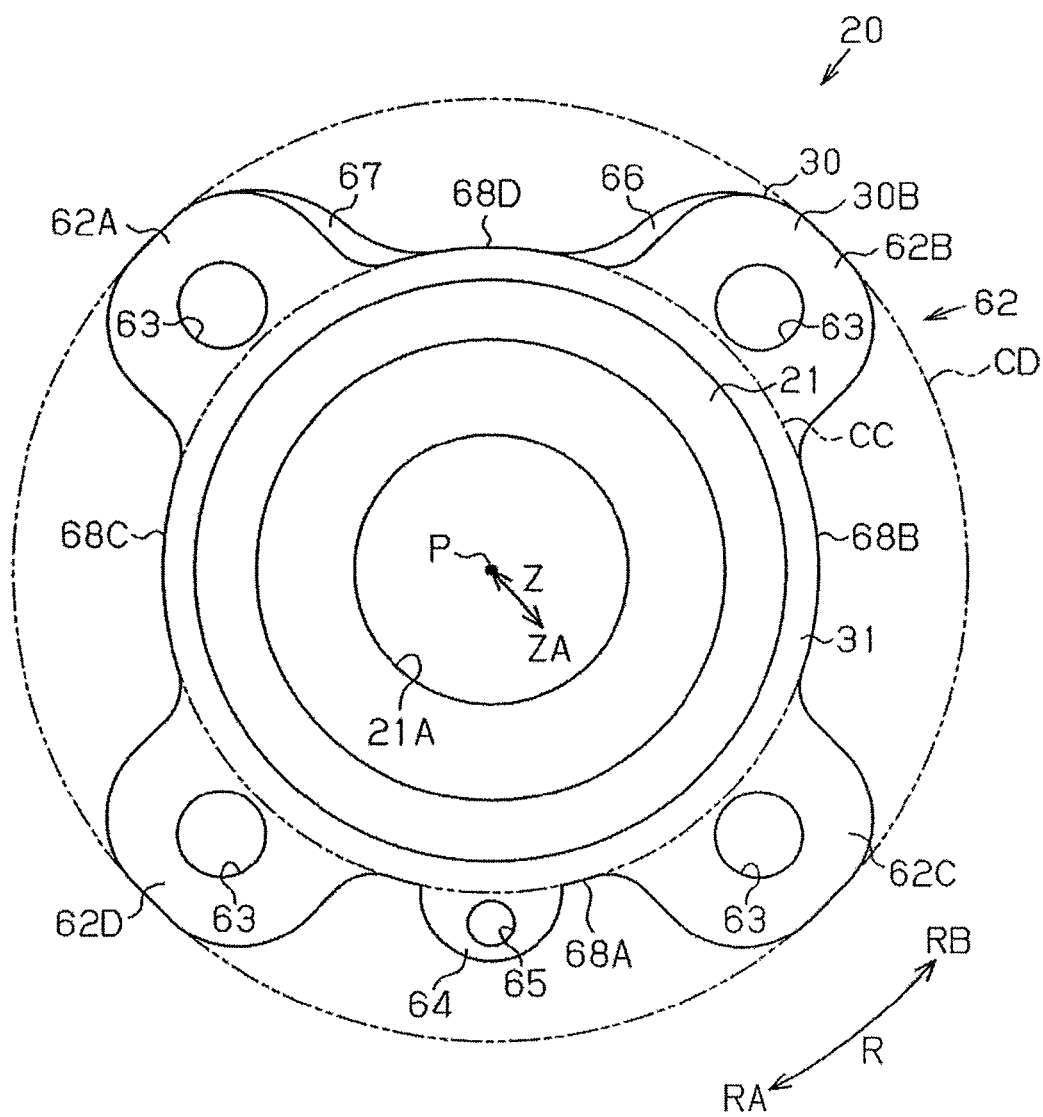
FIG. 3 is a front view illustrating the front structure of a hub according to a second embodiment.

As shown in FIG. 3, the flange portion 30 has the inner peripheral portion 31, a bolt hole formation portion group 62, a pin hole formation portion 64, and a first build-up portion 66 and a second build-up portion 67 as balance adjustment portions. The flange portion 30 has a reference position intermediate portion 68A, a first adjacent position intermediate portion 68B, a second adjacent position intermediate portion 68C, and a separate position intermediate portion 68D.

The bolt hole formation portion group 62 has bolt hole formation portions 62A through 62D in the first peripheral direction RA in the following order: the first bolt hole formation portion 62A, the second bolt hole formation portion 62B, the third bolt hole formation portion 62C, and the fourth bolt hole formation portion 62D.

Each of the bolt hole formation portions 62A through 62D has a hub side bolt hole 63. The bolt hole formation portions 62A through 62D are formed at equal intervals in the peripheral direction R. The bolt hole formation portions 62A through 62D are adjacent to each other in the peripheral direction R at a predetermined interval. The bolt hole formation portions 62A through 62D are of the same configuration. The sizes of the respective bolt hole formation portions 62A to 62D in the peripheral direction R are the same with one another.

The first bolt hole formation portion 62A and the second bolt hole formation portion 62B are adjacent to each other in the peripheral direction R with the separate position intermediate portion 68D therebetween. The second bolt hole formation portion 62B and the third bolt hole formation portion 62C are adjacent to each other in the peripheral direction R with the first adjacent position intermediate portion 68B therebetween. The first bolt hole formation portion 62A and the fourth bolt hole formation portion 62D are adjacent to each other in the peripheral direction R with the second adjacent position intermediate portion 68C therebetween. The third bolt hole formation portion 62C and the fourth bolt hole formation portion 62D are adjacent to each other in the peripheral direction R with the reference position intermediate portion 68A therebetween.

The five hub side bolt holes 63 are formed at equal intervals in the peripheral direction R.

The reference position intermediate portion 68A, the first adjacent position intermediate portion 68B, the second adjacent position intermediate portion 68C, and the separate position intermediate portion 68D correspond to spaces formed through partial lightening of the annular flange.

The reference position intermediate portion 68A corresponds to a space surrounded, in the reference plane, by the inner peripheral portion 31, the phantom circle CD, a side portion of the third bolt hole formation portion 62C, and the fourth bolt hole formation portion 62D. In the reference plane, the reference position intermediate portion 68A is opposite to the separate position intermediate portion 68D via the center axis P of the hub 20.

The first adjacent position intermediate portion 68B corresponds to a space surrounded, in the reference plane, by the inner peripheral portion 31, the phantom circle CD, a side portion of the third bolt hole formation portion 62C, and a side portion of the second bolt hole formation portion 62B. The first adjacent position intermediate portion 68B is adjacent to the reference position intermediate portion 68A in the peripheral direction R with the third bolt hole formation portion 62C therebetween.

The second adjacent position intermediate portion 68C corresponds to a space surrounded, in the reference plane, by the inner peripheral portion 31, the phantom circle CD, a side portion of the fourth bolt hole formation portion 62D, and a side portion of the first bolt hole formation portion 62A. The second adjacent position intermediate portion 68C is adjacent to the reference position intermediate portion 68A in the peripheral direction R with the fourth bolt hole formation portion 62D therebetween.

The separate position intermediate portion 68D corresponds to a space surrounded, in the reference plane, by the inner peripheral portion 31, the phantom circle CD, a side portion of the second bolt hole formation portion 62B, and a side portion of the first bolt hole formation portion 62A. The separate position intermediate portion 68D is adjacent to the first adjacent position intermediate portion 68B in the peripheral direction R with the second bolt hole formation portion 62B therebetween. The separate position intermediate portion 68D is adjacent to the second adjacent position intermediate portion 68C in the peripheral direction R with the first bolt hole formation portion 62A therebetween.

The pin hole formation portion 64 is formed in the reference position intermediate portion 68A. In the reference plane, the pin hole formation portion 64 is opposite to the separate position intermediate portion 68D with the center axis P of the flange portion 30 therebetween. The pin hole formation portion 64 has a hub side pin insertion hole 65.

The first build-up portion 66 is formed integrally with the second bolt hole formation portion 62B. The first build-up portion 66 is formed on the side portion on the second peripheral direction RB side of the second bolt hole formation portion 62B. The first build-up portion 66 is formed on the separate position intermediate portion 68D. The thickness of the first build-up portion 66 is smaller than the formation portion thickness TB. The thickness of the first build-up portion 66 indicates the dimension from the wheel facing surface 30A (refer to FIG. 1) to the vehicle body facing surface 30B of the first build-up portion 66.

The second build-up portion 67 is formed integrally with the first bolt hole formation portion 62A. The second build-up portion 67 is formed on the side portion on the second peripheral direction RB side of the first bolt hole formation portion 62A. The second build-up portion 67 is formed on the separate position intermediate portion 68D. The thickness of the second build-up portion 67 is smaller than the formation portion thickness TB. The thickness of the second build-up portion 67 indicates the dimension from the wheel facing surface 30A (refer to FIG. 1) to the vehicle body facing surface 30B of the second build-up portion 67.

The first build-up portion 66 has a volume VD and a weight WD. The second build-up portion 67 has a volume VE and a weight WE. The pin hole formation portion 64 has a volume VF and a weight WF. The sum of the volume VD and the volume VE is equal to the volume VF. The sum of the weight WD and the weight WE is equal to the weight WF. Thus, the first build-up portion 66 and the second build-up portion 67 are balanced with the pin hole formation portion 64 in terms of weight.

The vehicle bearing device 10 according to the second embodiment provides effects corresponding to the effects (1) and (2) of the first embodiment. Thus, the vehicle bearing device 10 according to the second embodiment helps to bring a hub into balance in terms of weight and to achieve reduction in weight.

(Other Embodiments)

The present vehicle bearing device includes embodiments other than the above-described embodiments. In the following, modifications of the above embodiments as other embodiments will be described. The following modifications may be combined with each other.

Figure 4:
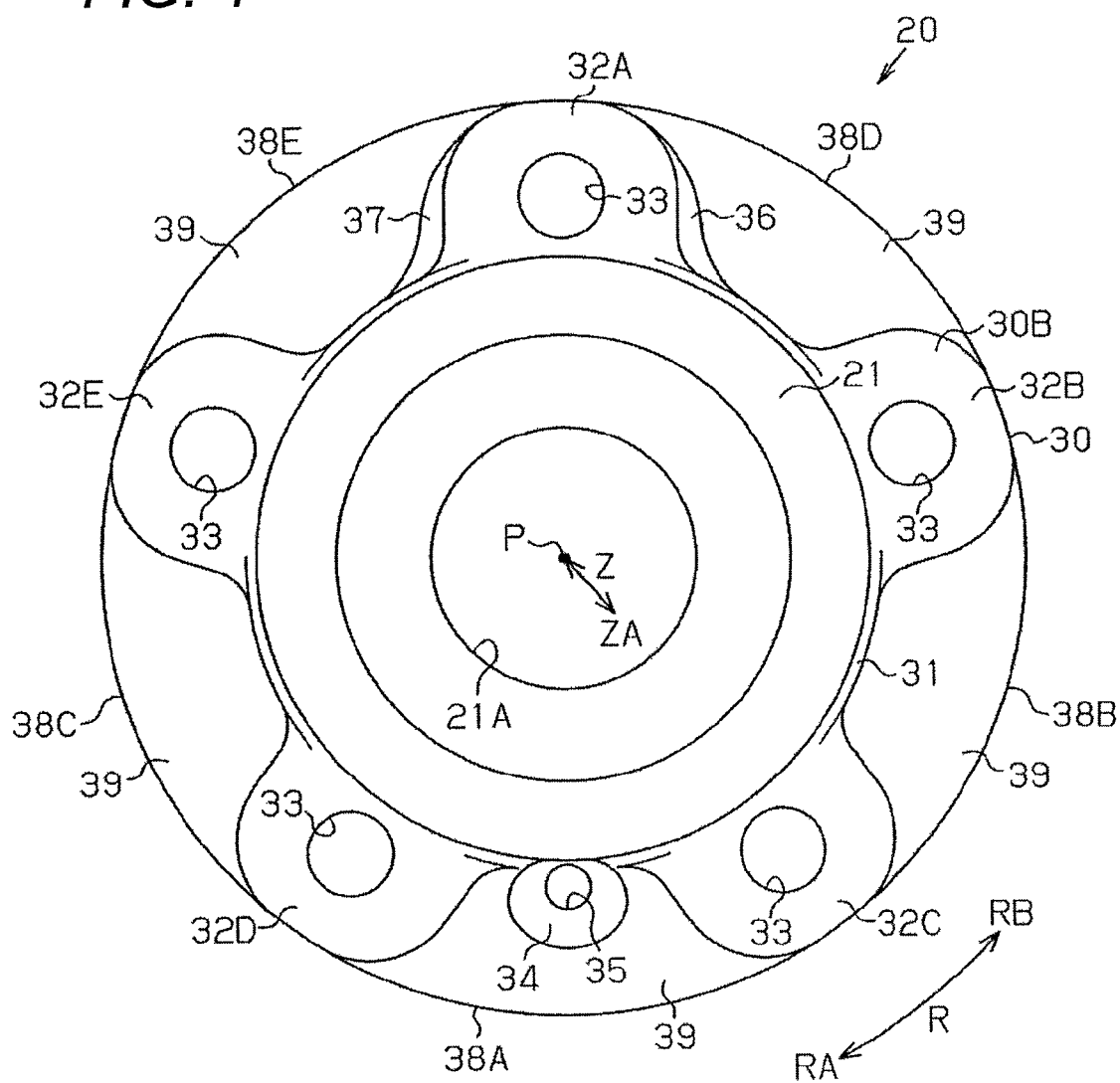
FIG. 4 is a front view illustrating the front structure of a hub according to a modification of the first embodiment.

In the hub 20 according to the first embodiment, part of the reference position intermediate portion 38A, the whole of the adjacent position intermediate portions 38B and 38C, and part of the separate position intermediate portions 38D and 38E are formed as spaces. However, the construction of the hub 20 is not restricted to this one. For example, the hub 20 according to the modification shown in FIG. 4 has an outer peripheral portion 39 at the reference position intermediate portion 38A, the adjacent position intermediate portions 38B and 38C, and the separate position intermediate portions 38D and 38E. The outer periphery of the outer peripheral portion 39 is identical with the phantom circle CD. The thickness of the outer peripheral portion 39 is smaller than the formation portion thickness TB and the insertion portion thickness TP. The thickness of the outer peripheral portion 39 indicates the dimension of the outer peripheral portion 39 as measured from the wheel facing surface 30A (refer to FIG. 1) to the vehicle body facing surface 30B.

The first build-up portion 36 and the second build-up portion 37 of the first embodiment are formed integrally with the first bolt hole formation portion 32A. However, the construction of the first build-up portion 36 and the second build-up portion 37 is not restricted to this one. For example, the first build-up portion 36 according to the modification is formed on the side portion on the second peripheral direction RB side of the second bolt hole formation portion 32B. The second build-up portion 37 according to the modification is formed on the side portion on the first peripheral direction RA side of the fifth bolt hole formation portion 32E.

Figure 5:
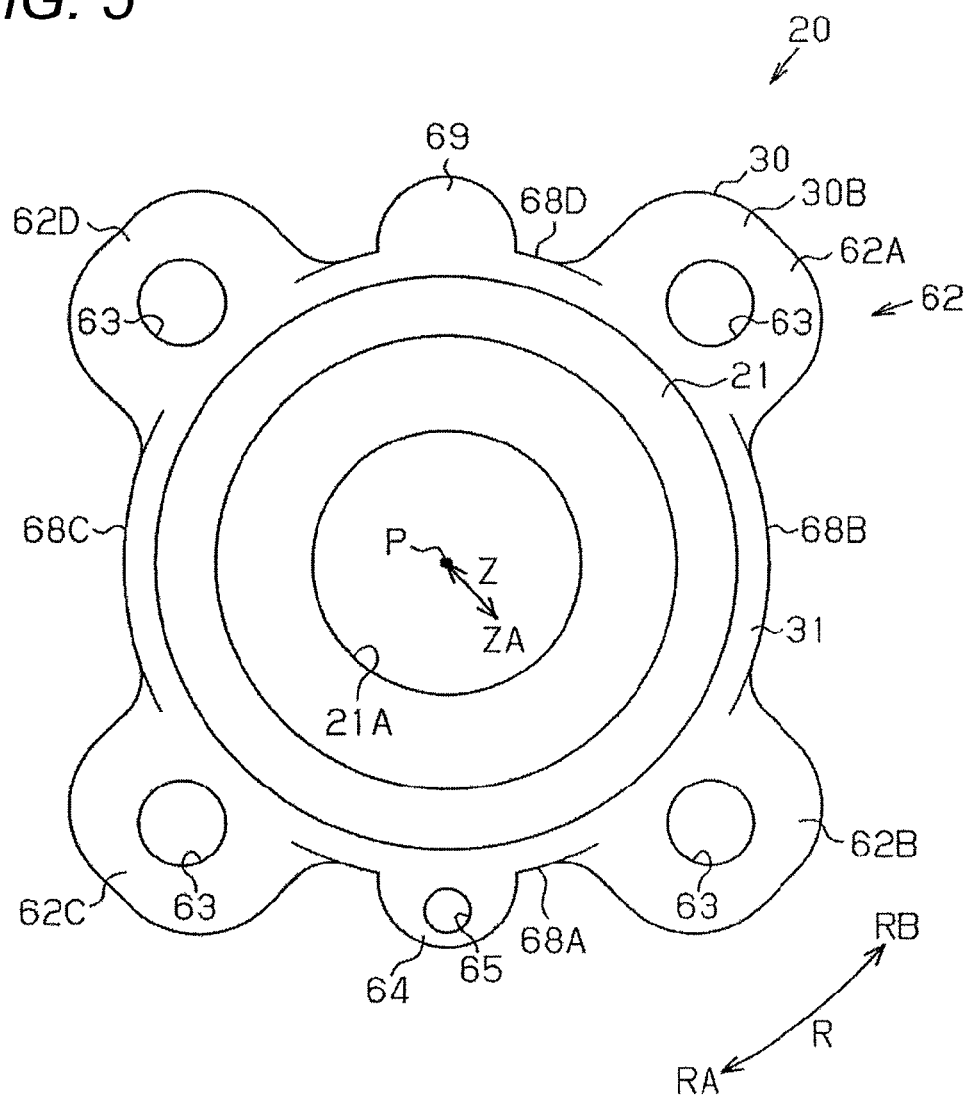
FIG. 5 is a front view illustrating the front structure of a hub according to a modification of the second embodiment.
Figure 6:
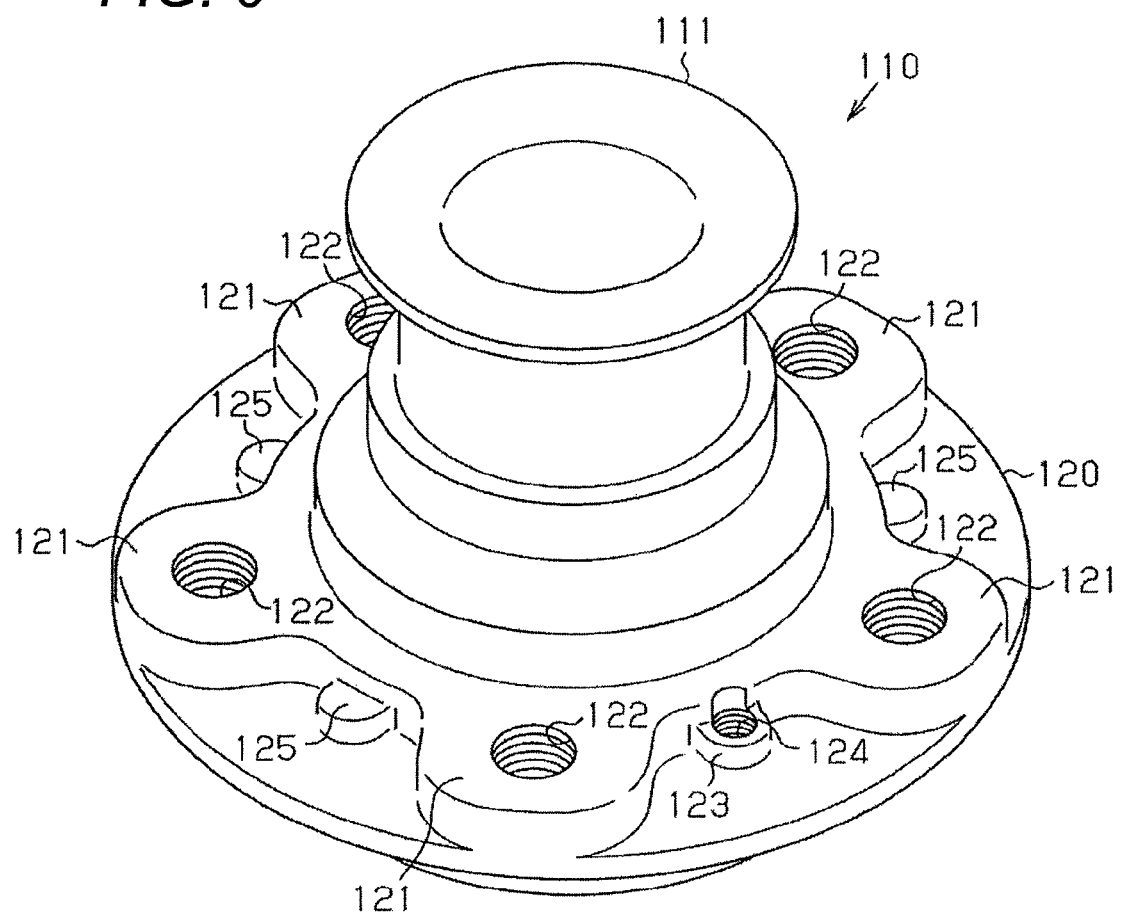
FIG. 6 is a perspective view illustrating the structure in perspective view of a hub of a conventional vehicle bearing device.

In the hub 20 of the second embodiment, the build-up portions 66 and 67 are formed on the flange portion 30. However, the construction of the hub 20 is not restricted to this one. For example, the build-up portions 66 and 67 are omitted in the hub 20 according to the modification shown in FIG. 5. This hub 20 has, on the flange portion 30, a protrusion 69 as a balance adjustment portion. The protrusion 69 is formed at the central portion in the peripheral direction R of the separate position intermediate portion 68D. The protrusion 69 protrudes outwards ZA from the inner peripheral portion 31. The protrusion 69 is of the same configuration as the pin hole formation portion 64. The volume of the protrusion 69 is equal to the volume of the pin hole formation portion 64. The protrusion 69 is balanced inn terms of weight with the pin hole formation portion 64. The protrusion 69 may also be of a configuration different from that of the pin hole formation portion 64.

In the hub 20 according to the second embodiment, lightening is effected at the reference position intermediate portion 68A, the adjacent position intermediate portions 68B and 68C, and the separate position intermediate portion 68D. However, the construction of the hub 20 is not restricted to this one. For example, the hub 20 according to a modification exhibits an outer peripheral portion at the reference position intermediate portion 68A, the adjacent position intermediate portions 68B and 68C, and the separate position intermediate portion 68D. The outer periphery of the outer peripheral portion is identical with the phantom circle CD. The thickness of the outer peripheral portion is smaller than the formation portion thickness TB and the insertion portion thickness TP. The thickness of the outer peripheral portion indicates the dimension of the outer peripheral portion as measured from the wheel facing surface 30A to the vehicle body facing surface 30B.

The hub side pin hole 35 of the above embodiments extends through the pin hole formation portion 34. However, the construction of the hub side pin hole 35 is not restricted to this one. For example, the hub side pin hole 35 according to a modification does not extend through the pin hole formation portion 34.

The hub side pin hole 35 of the above embodiments has a female screw. However, the construction of the hub side pin hole 35 is not restricted to this one. For example, the pin hole 35 according to a modification has no female screw.

In the flange portion 30 of the above embodiments, the thickness of the build-up portions 36, 37, 66, and 67 is smaller than the formation portion thickness TB. However, the construction of the flange portion 30 is not restricted to this one. For example, the thickness of build-up portions 36, 37, 66, and 67 according to a modification is equal to the formation portion thickness TB or larger than the formation portion thickness TB.

The vehicle bearing device 10 of the above embodiments has the inner ring 12 separate from the hub 20. However, the construction of the vehicle bearing device 10 is not restricted to this one. For example, in the vehicle bearing device 10 according to a modification, the hub 20 and the inner ring 12 are formed integrally.

The vehicle bearing device 10 of the above embodiments is formed as a bearing device for a driven wheel. However, this should not be construed restrictively. For example, the vehicle bearing device 10 according to a modification is formed as a bearing device for a driving wheel.

What is claimed is:

1. A vehicle bearing device with a hub,
   wherein the hub is a portion to which a brake rotor is fixed and which has a cylindrical portion and a flange portion;
   the flange portion has a plurality of bolt hole formation portions protruding outwardly from the cylindrical portion, one pin hole formation portion, one reference position intermediate portion, two adjacent position intermediate portions, one or a plurality of separate position intermediate portions, and a balance adjustment portion;
   the reference position intermediate portion is formed between the bolt hole formation portions adjacent to each other in the peripheral direction of the cylindrical portion;
   the adjacent position intermediate portions are formed between the bolt hole formation portions adjacent to each other in the peripheral direction of the cylindrical portion, and are formed at positions adjacent to the reference position intermediate portion with the bolt hole formation portion therebetween in the peripheral direction of the cylindrical portion;
   the separate position intermediate portions are formed between the bolt hole formation portions adjacent to each other in the peripheral direction of the cylindrical portion, and are formed at positions adjacent to the adjacent position intermediate portions with the bolt hole formation portions therebetween in the peripheral direction of the cylindrical portion and at positions on the side opposite to the reference position intermediate portion with respect to the adjacent position intermediate portions;
   the bolt hole formation portions have hub side bolt holes;
   the plurality of bolt hole formation portions are formed at equal intervals in the peripheral direction of the flange portion;
   the hub side bolt holes are formed as portions into which wheel bolts for fixing the hub and the brake rotor to each other are inserted;
   the pin hole formation portion is formed at the reference position intermediate portion, and has a hub side pin hole;
   the hub side pin hole is formed as a portion into which a pin for fixing the hub and the brake rotor to each other is inserted; and
   the balance adjustment portion is formed at the one or the plurality of separate position intermediate portions, and the balance adjustment portion is balanced in weight with the pin hole formation portion.

2. The vehicle bearing device according to claim 1, wherein the radius of the hub at the one reference position intermediate portion, the two adjacent position intermediate portions, and the one or the plurality of separate position intermediate portions is smaller than the radius of the hub at the bolt hole formation portions.

3. The vehicle bearing device according to claim 1, wherein the flange portion has a build-up portion as the balance adjustment portion; and
   the build-up portion is formed integrally with the bolt hole formation portion forming the separate position intermediate portion.

4. The vehicle bearing device according to claim 3, wherein the flange portion has the five bolt hole formation portions, and the plurality of build-up portions;
   one of the plurality of build-up portions is formed integrally with one side portion in the peripheral direction of the bolt hole formation portion opposite to the hub side pin hole with the center axis of the hub therebetween; and
   another of the plurality of build-up portions is formed integrally with the other side portion in the peripheral direction of the bolt hole formation portion opposite to the hub side pin hole with the center axis of the hub therebetween.

5. The vehicle bearing device according to claim 3, wherein the flange portion has the four bolt hole formation portions, and the plurality of build-up portions;
   one of the plurality of build-up portions is formed integrally with a side portion of one bolt hole formation portion forming the separate position intermediate portion; and
   another of the plurality of build-up portions is formed integrally with a side portion of the other bolt hole formation portion forming the separate position intermediate portion.

6. The vehicle bearing device according to claim 1, wherein the balance adjustment portion is formed as a protrusion protruding outwardly from the cylindrical portion.

7. The vehicle bearing device according to claim 6, wherein the flange portion has the four bolt hole formation portions; and
   the protrusion is formed at a central portion of the separate position intermediate portion opposite to the hub side pin hole with the center axis of the hub therebetween.

8. A vehicle bearing device with a hub,
   wherein the hub is a portion to which a brake rotor is fixed and which has a cylindrical portion and a flange portion;
   the flange portion has a plurality of bolt hole formation portions protruding outwardly from the cylindrical portion, one pin hole formation portion, one reference position intermediate portion, two adjacent position intermediate portions, one or a plurality of separate position intermediate portions, and a balance adjustment portion;
   the reference position intermediate portion is formed between the bolt hole formation portions adjacent to each other in the peripheral direction of the cylindrical portion;
   the adjacent position intermediate portions are formed between the bolt hole formation portions adjacent to each other in the peripheral direction of the cylindrical portion, and are formed at positions adjacent to the reference position intermediate portion with the bolt hole formation portion therebetween in the peripheral direction of the cylindrical portion;
   the separate position intermediate portions are formed between the bolt hole formation portions adjacent to each other in the peripheral direction of the cylindrical portion, and are formed at positions adjacent to the adjacent position intermediate portions with the bolt hole formation portions therebetween in the peripheral direction of the cylindrical portion and at positions on the side opposite to the reference position intermediate portion with respect to the adjacent position intermediate portions;

the bolt hole formation portions have hub side bolt holes;

the plurality of bolt hole formation portions are formed at equal intervals in the peripheral direction of the flange portion;

the hub side bolt holes are formed as portions into which wheel bolts for fixing the hub and the brake rotor to each other are inserted;

the pin hole formation portion is formed at the reference position intermediate portion, and has a hub side pin hole;

the hub side pin hole is formed as a portion into which a pin for fixing the hub and the brake rotor to each other is inserted; and the balance adjustment portion is formed at the one or the plurality of separate position intermediate portions, and a weight of the balance adjustment portion is equal to a weight of the pin hole formation portion.

* * * * *